(12) United States Patent
Adelberg et al.

(10) Patent No.: US 7,716,570 B2
(45) Date of Patent: May 11, 2010

(54) INTERFACES FOR CREATION AND ACCESS OF EXTENSIBLE MARKUP LANGUAGE PAPER SPECIFICATION DOCUMENTS

(75) Inventors: Brian Scott Adelberg, Issaquah, WA (US); Khaled Sedky, Sammamish, WA (US); Donny Amalo, Bellevue, WA (US); Mahmood A. Dhalla, Sammamish, WA (US); Robert John Anderson, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 1184 days.

(21) Appl. No.: 11/301,132

(22) Filed: Dec. 12, 2005

(65) Prior Publication Data

US 2007/0136659 A1    Jun. 14, 2007

(51) Int. Cl.
*G06F 17/00* (2006.01)
*G06F 9/44* (2006.01)
(52) U.S. Cl. ............... 715/209; 715/200; 715/234; 717/120; 717/123
(58) Field of Classification Search .......... 715/209, 715/238; 717/120, 123
See application file for complete search history.

(56) References Cited

U.S. PATENT DOCUMENTS

| | | | | |
|---|---|---|---|---|
| 6,073,148 | A * | 6/2000 | Rowe et al. | 715/205 |
| 7,233,956 | B2 * | 6/2007 | Balducci et al. | 707/102 |
| 2004/0261017 | A1 * | 12/2004 | Perry | 715/513 |
| 2004/0268238 | A1 * | 12/2004 | Liu et al. | 715/513 |
| 2005/0114757 | A1 * | 5/2005 | Sahota et al. | 715/501.1 |
| 2005/0188305 | A1 * | 8/2005 | Costa et al. | 715/530 |
| 2005/0262134 | A1 * | 11/2005 | Sedky et al. | 707/103 R |
| 2008/0163043 | A1 * | 7/2008 | van Eikeren et al. | 715/255 |

OTHER PUBLICATIONS

Adobe PDF vs Microsoft XPS (XML Paper Specification), Jan. 26, 2006, http://labnol.blogspot.com/2006/01/adobe-pdf-vs-microsoft-xps-xml-paper.html.*
"Adobe PDF vs Microsoft XPS (XML Paper Specification)", Jan. 28, 2006, http://labnol.blogspot.com/2006/01/adobe-pdf-vs-microsoft-xps-xml-paper.html.*
"An Adobe Killer from Microsoft", Apr. 26, 2005, http://labnol.blogspot.com/2005/04/adobe-killer-from-microsoft.html.*
"How does Microsoft Metro compare with Adobe PDF", Jun. 14, 2005, http://labnol.blogspot.com/2005/06/how-does-microsoft-metro-compare-with.html.*
Yokoyama et al, "An Access Control Method Based on the Prefix Labeling Scheme for XML Repositories", Copyright (c) 2005, Australian Computer Society, Inc. This paperappeared at the 16th Australasian Database Conference, University of Newcastle, Newcastle, Australia. Conferences in Research and Practice in Information Technology, vol. 39. H.E. Will.*

* cited by examiner

*Primary Examiner*—Wei Y Zhen
*Assistant Examiner*—Charles Swift

(57) ABSTRACT

XPS documents are created and accessed via a collection of interfaces of various classes of an application programming interface. The application programming interface includes a document sequence class for reading and writing the document sequence of the XPS document, a fixed document class for reading and writing the fixed documents of the document sequence, a page class for reading and writing the pages of the fixed documents, and a resource class for accessing the resources of each page. Applications seeking to create or read XPS documents may utilize the application programming interface such that the complexities of creating and accessing the XPS document are abstracted away.

14 Claims, 6 Drawing Sheets

US 7,716,570 B2

INTERFACES FOR CREATION AND ACCESS OF EXTENSIBLE MARKUP LANGUAGE PAPER SPECIFICATION DOCUMENTS

BACKGROUND

Electronic documents are convenient in that they can be created, edited, and transported by a user of a personal computer. However, electronic documents are often tied to a specific computer application of the computer application. Furthermore, the specific computer application is tied to a specific operating system of the personal computer. While it may be convenient to create, edit, and transport the electronic document, exchanging the document between computer systems such as when electronically sending the electronic document to a different user requires that the personal computer of the different user also have the same application, and to the extent the application is limited to a specific operating system, then also have the specific operating system to implement the application.

Even for ubiquitous computer operating systems and corresponding application programs, there is no guarantee that a user being sent an electronic document will have the correct application necessary to view and print the electronic document. Furthermore, where the application being used to generate the electronic document is a custom application written for a specific operating system, the probability is much greater that at some point a user being sent the electronic document for purposes of viewing and/or printing the electronic document will not have the appropriate application. As an additional problem, there may be instances where there are multiple electronic documents corresponding to multiple applications that are being transferred to another user or personal computer for display and printing such that the probability is higher that the destination user and personal computer will not have all of the applications necessary to view and print all of the electronic documents.

SUMMARY

The extensible markup language paper specification (XPS) document has been developed to address these issues and others. The XPS document is a format that allows a known set of rendering rules to be used to reproduce a fixed document via display or printing without tying client devices or applications to operating systems or service libraries. An XPS document is created following a known hierarchy as provided in an XPS specification that encapsulates the document structure.

In order to facilitate the creation and access to the XPS document in conformance with the XPS specification, embodiments provide an XPS conformant application programming interface in order to abstract away the complexities of creating a well formed XPS document. The application programming interface provides a set of interface that allow for reading and writing a document sequence, individual fixed documents of the document sequence, and individual pages of fixed documents that make up the XPS document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments provide for the creation of and access to an XPS document in accordance with an XPS specification. An application programming interface (API) may be provided so that an application intending to create or access an XPS document may call upon the API so that the complexities of the XPS document conversion is abstracted away from the user. In addition to the basic creation of and access to the XPS document, the API may provide for higher level functionality including adding and verifying digital signatures as well as specifying various properties for the XPS document.

Figure 1:
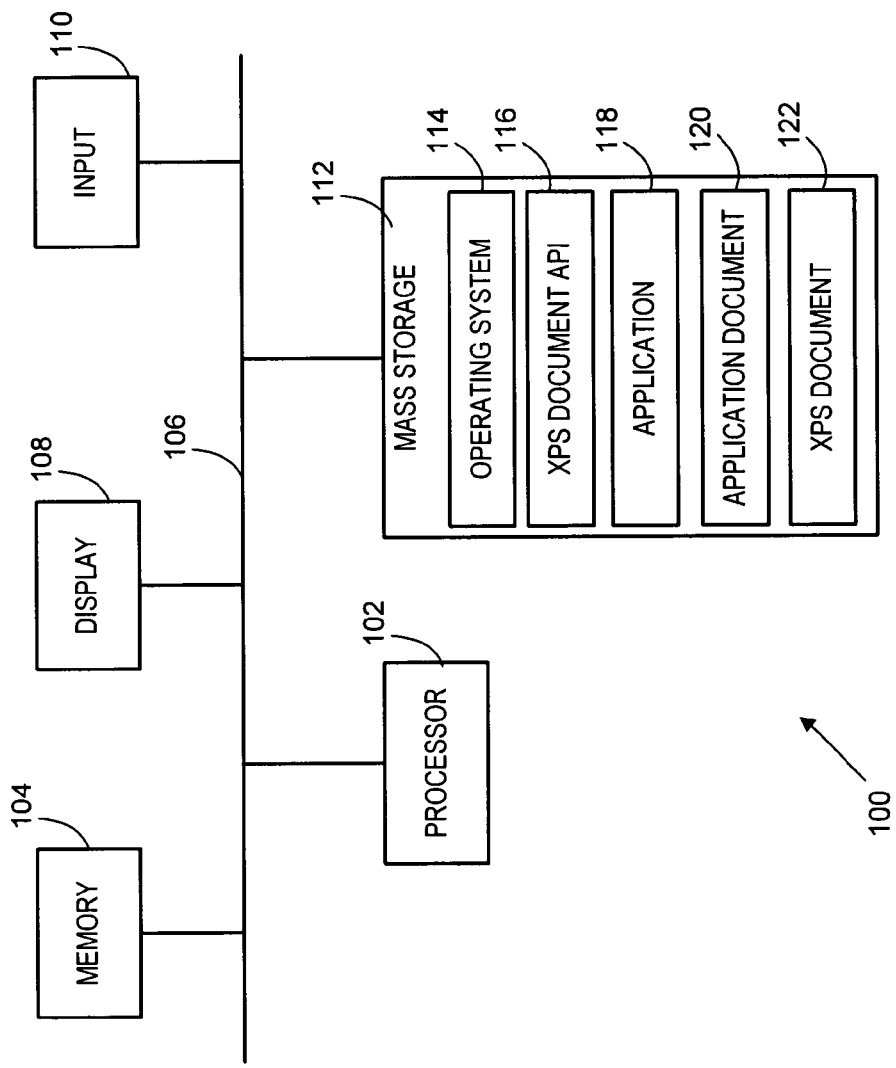
FIG. 1 shows one example of a computer system for implementing embodiments for creating and accessing XPS documents.

FIG. 1 shows an example of a computer system 100 that provides an operating environment for the embodiments. The computer system 100 as shown may be a standard, general-purpose programmable computer system 100 including a processor 102 as well as various components including mass storage 112, memory 104, a display adapter 108, and one or more input devices 110. The processor 102 communicates with each of the components through a data signaling bus 106. The computer system 100 may alternatively be a hard-wired, application specific device that implements one or more of the embodiments.

In the example, of FIG. 1, the processor 102 implements instructions stored in the mass storage 112 in the form of an operating system 114. The mass storage 114 also includes an XPS Document API 116 for creating and accessing XPS documents 122 in conformance with the XPS specification which is incorporated herein by reference and which can be found at http://www.microsoft.com, and in particular, http://www.microsoft.com/whdc/xps/xpsspec.mspx, or http://go.microsoft.com/fwlink/?LinkID=51859&clcid=0x409. The mass storage 144 includes one or more application programs 118 that may be used to originate electronic documents 120 and that utilize the XPS Document API 116 to create an XPS document 122 from the original electronic document(s) 120.

As noted above, the XPS Document API 116 provide services to application programs 118 attempting to create or display XPS documents in the form of classes and various related interfaces for receiving input from the application for specifying information about the XPS document and for producing corresponding outputs that correspond to XPS document components. The XPS Document API 116 represents the persistence layer which contains the logic of how to persist different components including the sub-documents of a document sequence, the individual pages of the sub-documents, and the resources of the individual pages including fonts, images, and the like. The XPS Document API 116 is also driven by the resource, packaging, and interleaving policies set forth within the XPS Document specification identified above. It will be appreciated that the XPS Document API 116 also works in conjunction with a serialization phase that provides serialization services between the XPS Document API 116 and the applications 118. However, the aspects of the serialization phase are beyond the scope of the present document. Various figures and related discussion are provided to illustrate the structure and operations of the XPS Document API 116. However, it should be appreciated that the screenshots, structure and related operation are provided only for the purposes of illustration and are not intended to be limiting of the scope of the claims set forth below.

The computer system 100 of FIG. 1 typically includes a variety of computer readable media. Computer readable media can be any available media that can be accessed by computer 100 and includes both volatile and nonvolatile media, removable and non-removable media. By way of example, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
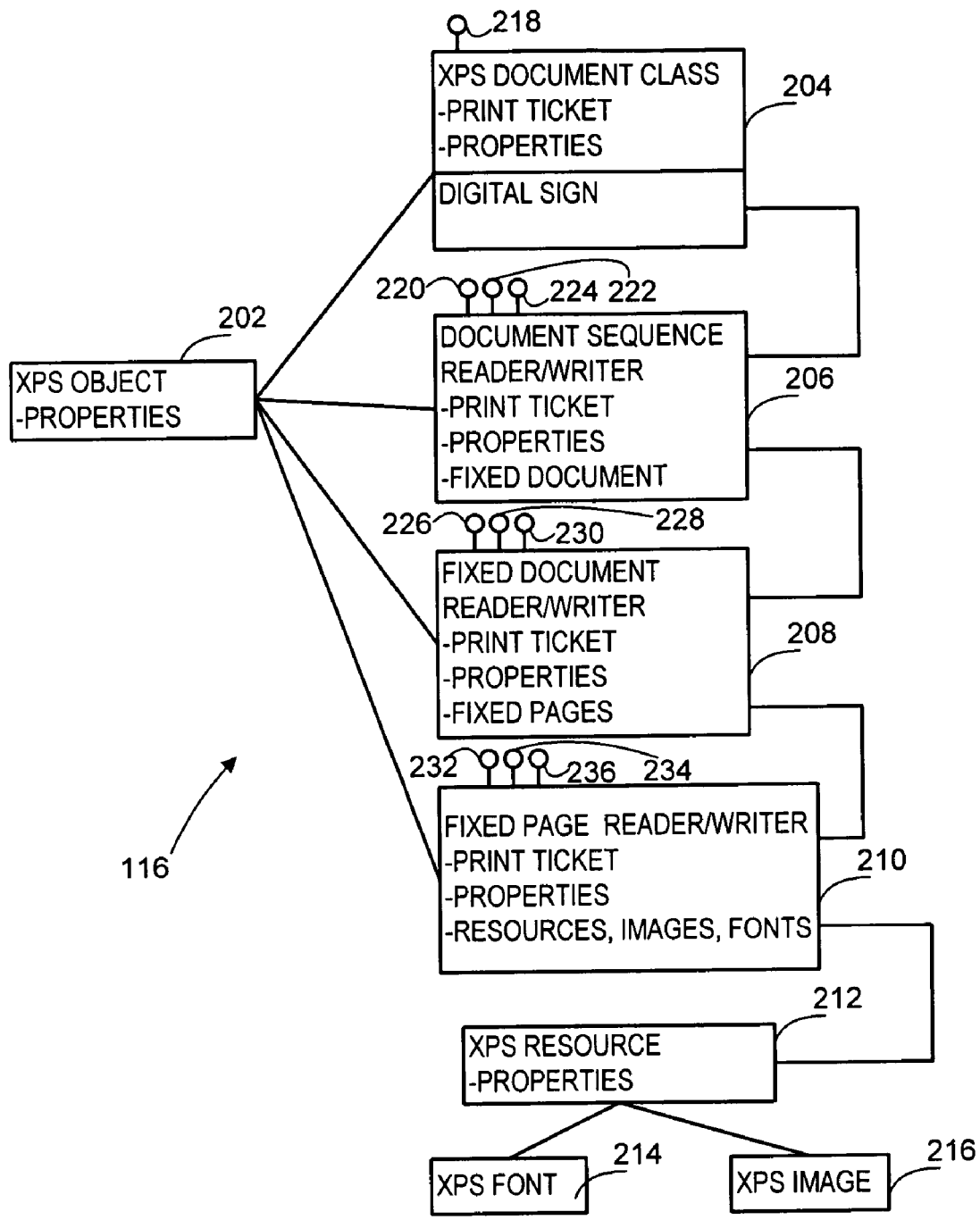
FIG. 2 shows one example of the sets of components of an application programming interface for creating and accessing XPS documents.

FIG. 2 shows the class hierarchy of the XPS Document API 116. An XPS object 202 having XPS Document properties and including an inheritance upon various XPS object classes. The XPS object classes include an XPS document class 204, a document sequence class 206, a fixed document class 208, a page class 210, a resource class 212, an XPS font class 214 and an XPS image class 216.

The XPS document class 204 is the entry point to the XPS Document API 116 and provides access to the highest level of functionality. The XPS document class 204 provides access to XPS digital signatures and signature definitions. As discussed below, the digital signatures may be inherited down the hierarchy of levels of the XPS Document API 116 and in doing so, when an XPS document part, such as an individual fixed document, is moved to a different XPS document, the digital signature associated with the individual fixed document is present once it has been moved to the different XPS Document. Furthermore, the XPS document properties can be modified from this XPS document class 204. The XPS document class 204 exposes an interface 218 whereby the higher level functions, in particular the digital signatures and signature definitions, may be accessed for an existing XPS document.

From the XPS document class 204, the root component of the XPS Document API 116, which is the document sequence, can be created or accessed. The document sequence class 206 provides reader and writer functions at the document sequence level for an XPS document. An XPS document can contain a collection of sub-documents, like separate sections of a patent document that includes a text section or sub-document and a drawings section or sub-document. The document sequence represents this collection of sub-documents. The XPS Document API 116 provides access to the document sequence for an XPS document through interfaces exposed by the document sequence class 206. Namely, a document sequence writer interface 222 for creating the document sequence of an XPS document and a document sequence reader interface 224 for consumption (i.e., displaying and/or printing) of the document sequence of the XPS document once it has been created.

At the document sequence class 206, a print ticket may be defined for the document sequence. The print ticket is a set of meta-data that describes how a document can be printed. The print ticket associated with a document sequence of an XPS document via the document sequence class 206 may be applied to all of the sub-documents of the document sequence if any of the sub-documents do not have print tickets of their own. Properties may also be specified for the document sequence or they may be inherited from the XPS document class 204. Furthermore, digital signatures may be specified via a separate interface 220, or by inheritance from the XPS document class 204.

From the document sequence class 206, an individual fixed document of the document sequence can be created or accessed. The XPS Document API 116 provides access to the individual fixed documents of the document sequence for an XPS document through interfaces exposed by a fixed document class 208. The fixed document class 208 provides reader and writer functions at the fixed document level. Namely, a document writer interface 228 is provided for creating the fixed documents as a collection of pages and a document reader interface 230 is provided for consumption of the individual fixed documents once they have been created as a collection of pages.

At the fixed document class 208, a print ticket may be defined for the fixed document. As discussed above, the print ticket is a set of meta data that describes how the fixed document including all of its individual pages that do not have their own print ticket can be printed. Properties may also be specified for the individual fixed documents or they may be inherited from the XPS document class 204. Furthermore, digital signatures may be specified via a separate interface 226, or by inheritance from the XPS document class 204.

From the fixed document class 208, lowest layer in the hierarchy, which is the page, can be created or accessed. The page contains the actual data of describing how to render. The page class 210 provides reader and writer functions at the page level for an XPS document. The XPS Document API 116 provides access to the individual pages of the individual fixed documents for an XPS document through interfaces exposed by the page class 210. Namely, a page writer interface 234 for creating the individual pages and a page reader interface 236 for consumption of the individual pages of the fixed documents once they have been created.

At the page class 210, a print ticket may be defined for the page. As discussed above, the print ticket is a set of meta-data that describes how a document, and particular pages of the document, can be printed. Properties may also be specified for the individual pages or they may be inherited from the XPS document class 204. Furthermore, digital signatures may be specified via a separate interface 232, or by inheritance from the XPS document class 204.

A page of an XPS document may have a number of resources associated with it. These resources all derive from a common class, the XPS resource class 212. The types of resources that derive from the XPS resource class 212 include images of an XPS images class 216 and fonts of an XPS fonts class 214. Other types of resources may also derive from the XPS resource class 212 such as color context and resource dictionaries which also have representative XPS classes.

In practice, the user of an application wishing to create an XPS document from an original document utilizes an application that utilizes the XPS Document API 116. Via the read and write interfaces of each of the levels of the XPS Document, the authoring application may provide the corresponding data to XPS Document API 116 in the particular sequence to build the XPS document per the XPS specification. Initially, the authoring application may submit the document sequence information via the document sequence writer interface 222, then submit the fixed document information for each of the fixed documents of the document sequence via the document writer interface 228, and then may submit the details of each page of each fixed document via the page writer interface 234. The XPS Document API 116 generates the XPS document in accordance with the XPS specification based on the information submitted by the authoring application.

The information generated via the document sequence and fixed document classes includes organizational data as well as the data of the higher functions, including any print ticket data, properties or annotation data, as well as digital signature definition and digital signature data. For the document sequence class 206, the organization data is that which specifies the sequence of the fixed documents set forth by the document class 208. For the fixed document class 208, the organization data includes that which specifies the order of the individual pages of each of the fixed documents.

The details of one illustrative implementation follow. Specifically for this implementation, the fixed document sequence mark up contains paths to the individual fixed documents. The fixed document mark up contains paths to the individual pages and the digital signature definitions as well as link target information for hyperlinks which can be referenced in the page. Certain fonts may have flags indicating restrictions on copy and use of these flags is indicated by creating a specific relationship to the fixed document. Each layer is responsible for serializing its Print Tickets.

The page layer is responsible for maintaining a relationship part that maintains a list of all associated resources. These relationships have types associated with them. This mechanism is used to identify fonts that have been obfuscated to prevent simple illegal copying. The page layer also maintains embedded link information.

As discussed below with reference to FIG. 3, there are separate virtual files (parts) used for document properties and signature information within an XPS Document. A determination is made as to the list of these parts that need to be collected to be part of a hash for digital signing purposes. In practice, the markup may be parsed to regenerate the structure of the original document being represented by the markup, and the part relationships and relationship types are maintained.

Figure 3:
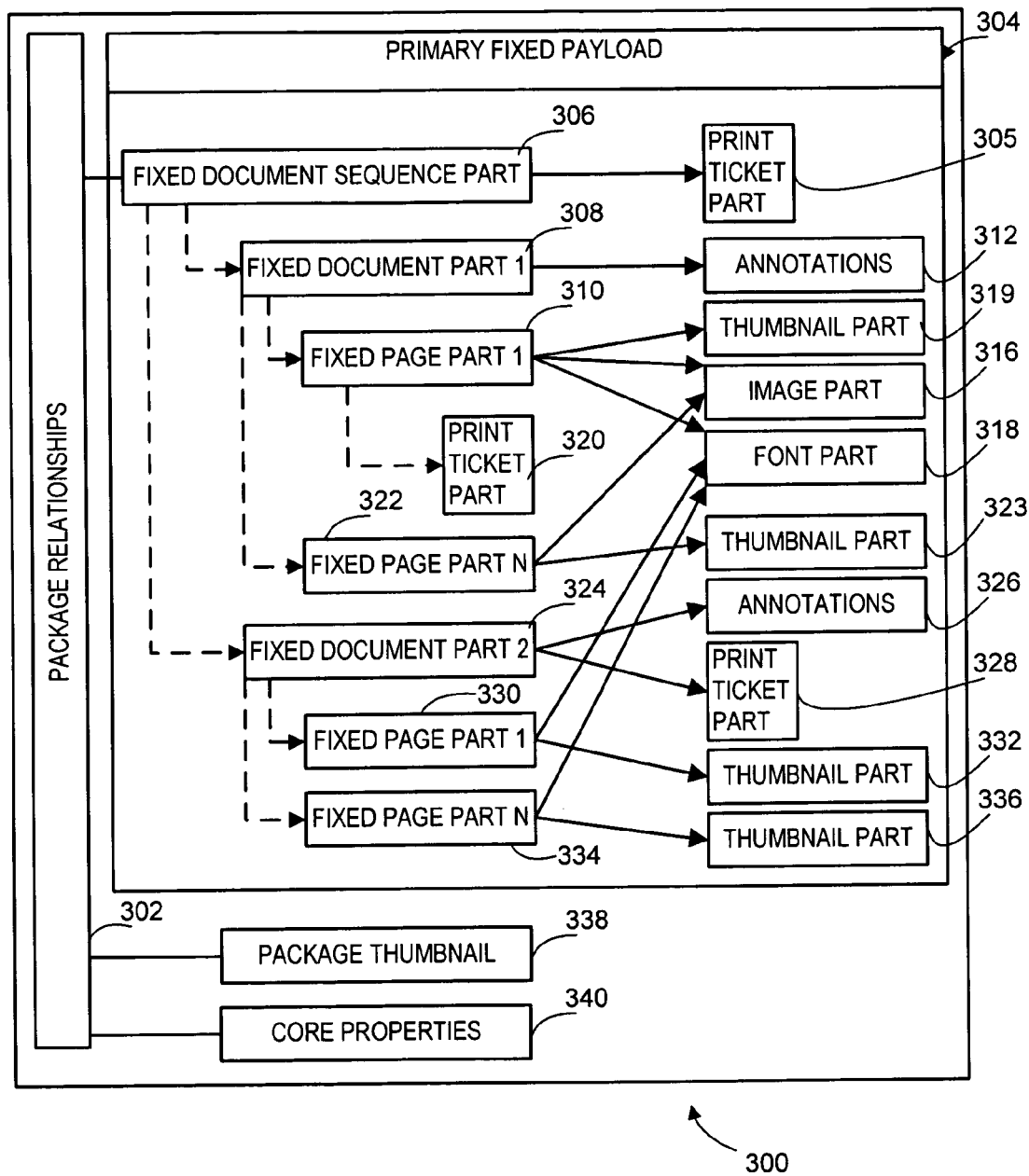
FIG. 3 shows an example of the structure of an XPS document being created or accessed via the application programming interface of FIG. 2.

FIG. 3 shows one example of a resulting XPS Document 300 upon creation by the XPS Document API 116 and serialization via a serialization phase. The XPS Document 300 includes a primary fixed payload 304 that sets forth the document sequence, documents, and pages. In addition to the primary fixed payload 304, a set of package relationships 302 is produced that relates component parts of the primary fixed payload 304 to a set of package thumbnails 338 and to a set of core properties 340 that have been defined for the XPS document 300. The primary fixed payload 304 is only one example of the fixed payload of an XPS document and is provided only for the purpose of illustration. For example, the number of fixed document parts for the document sequence may vary and the number of fixed page parts per fixed document part may vary. Furthermore, the print ticket parts, annotation parts, thumbnail parts, image parts, and font parts that are present at each level of the hierarchy may also vary from that shown, e.g., all pages may be associated with print tickets, thumbnail images, and annotation rather than only a select few. However, it may be desirable in one or more embodiments for each page part, document part, and document sequence part to have a single annotations part, single thumbnail part, and single print ticket part.

The hierarchy of the XPS Document object 202 is reflected in the primary payload 304 of the XPS Document 300. A fixed document sequence part 306 is at a top level of the payload 304. The fixed document sequence part 306 specifies the document sequence for the XPS document. The fixed document sequence part 306 is associated with a print ticket part 305 that specifies how the documents of the fixed document sequence should be printed if the documents do not have their own print tickets.

The next level which is associated with the document sequence part 306 includes a fixed document part 1 308, a fixed document part 2 324, and so on. The fixed document part 1 308 is associated with an annotations part 312 that includes such things as highlights, comments, etc. for the document 308. It should be noted that there is a separate specification for annotation mark up. Annotations allow for comments and editing suggestions for a fixed document. The XPS Specification states that the annotation should be in a separate part (virtual file) and that a relationship exists from the fixed document of a specific type.

Returning to FIG. 3, the fixed document part 1308 is associated with fixed page part 1 310, fixed page part N 322, and so on. The fixed document part 2 324 is associated with an annotations part 326, a print ticket part 328, as well as fixed page part 330, fixed page part N 334, and so on.

The fixed page part 1 310 itself is associated with a print ticket 320 that specifies how the fixed page part 1 310 should be printed. The fixed page part 310 is also associated with a thumbnail part 319 that is a thumbnail view of the fixed page part 310, an image part 316 that provides the images contained within the fixed page part 1 310, and a font part 318 that provides the fonts of the text contained within the fixed page part 1 310. The fixed page part N 322 is associated with the image part 316 that provides the images contained within the fixed page part N 322 and is also associated with a thumbnail part 323 that is a thumbnail view of the fixed page part N 322.

The fixed page part 1 330 is associated with is associated with the font part 318 that provides the fonts of the text contained within the fixed page part 1 330. The fixed page part 1 330 is also associated with a thumbnail part 332 that represents a thumbnail view of the fixed page part 1 330. The fixed page part N 334 is associated with font page 318 that provides the fonts of the text contained within the fixed page part N 334. The fixed page part N 334 is also associated with a thumbnail part 336 that provides a thumbnail view of the fixed page part N 334.

Figure 4:
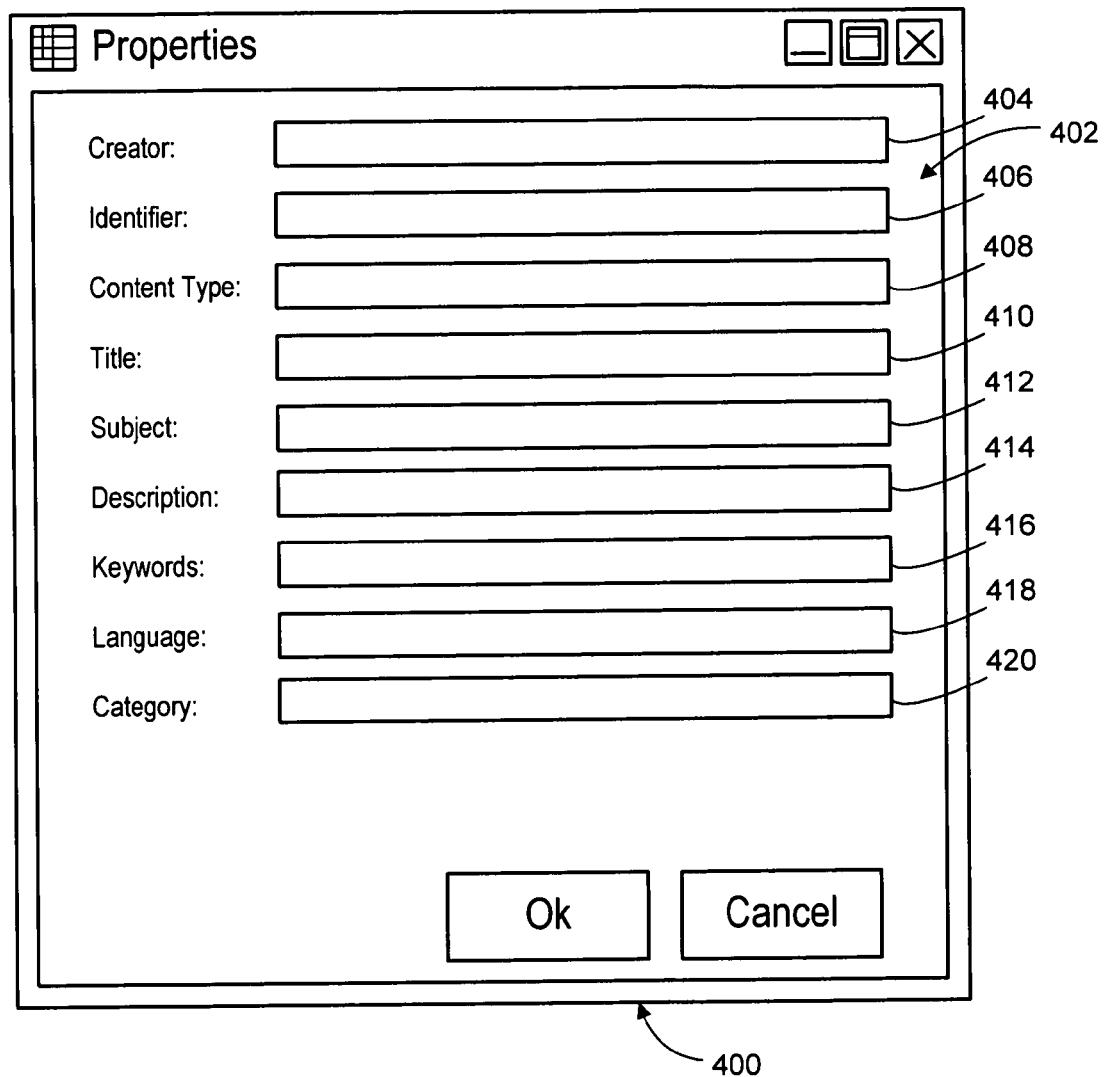
FIG. 4 shows an example of a graphical user interface of an application that utilizes the application programming interface of FIG. 2 to add or modify properties to an XPS document.

During creation of the XPS document or at some later time, it may be desirable to add properties for the XPS document. The application utilizing the XPS Document API 116 may provide a graphical user interface 400 such as the example shown in FIG. 4 to allow a user to enter the properties data and may then utilize a writer interface of one or more of the classes of the XPS Document API 116 to add that properties data to the primary payload of the XPS Document. In the example shown, the graphical user interface 400 includes a set 402 of fields for receiving the data. Field 404 receives a name of the creator of the electronic document, field 406 provides an identifier for the electronic document, field 408 provides a content type for the electronic document such as "Spreadsheet" or "Financial Analysis," for example. Additional fields include field 410 which receives the title of the electronic document, field 412 which receives a subject of the electronic document, field 414 which receives a brief description of the electronic document, field 416 which receives keywords for the electronic document, field 418 which receives a language which the electronic document is written in, and field 420 which receives the category information of the electronic document. It will be appreciated that the fields and associated properties shown in FIG. 4 are provided only for purposes of illustration and the number and type of properties may vary from one XPS document to another.

Figure 5:
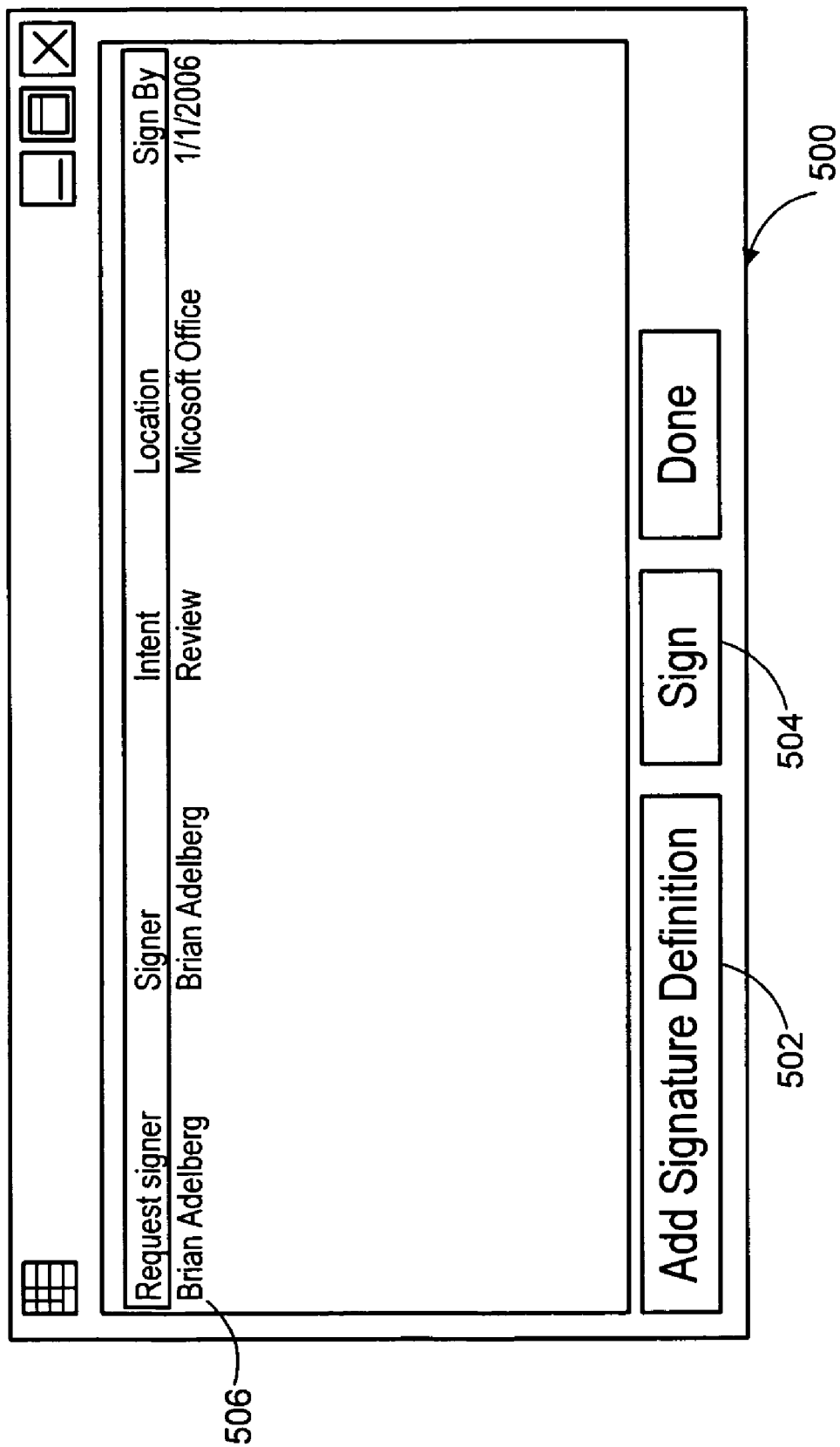
FIG. 5 shows an example of a graphical user interface of an application that utilizes the application programming interface of FIG. 2 to provide options to add digital signature definitions and to receive digital signatures for an XPS document.

FIG. 5 shows an example of a graphical user interface 500 of an application that utilizes the XPS Document API 116 to allow a user to add signature definitions for an XPS document and then to sign the XPS document. The application then accesses the digital signatures interface of one or more of the classes of the XPS Document API 116 to add the digital signature definitions and the digital signatures themselves to the primary payload of the XPS document. The graphical user 500 includes button 502 for adding digital signatures to the XPS document and a button 504 for digitally signing the XPS document. The graphical user interface 500 includes records 506 of the digital signatures that have been added. In this example, the digital signatures have a requested signer, an actual signer if one exists, an intent for accessing the XPS document, a location where the XPS document should be accessed from, and a date that the XPS document should be signed by.

Figure 6:
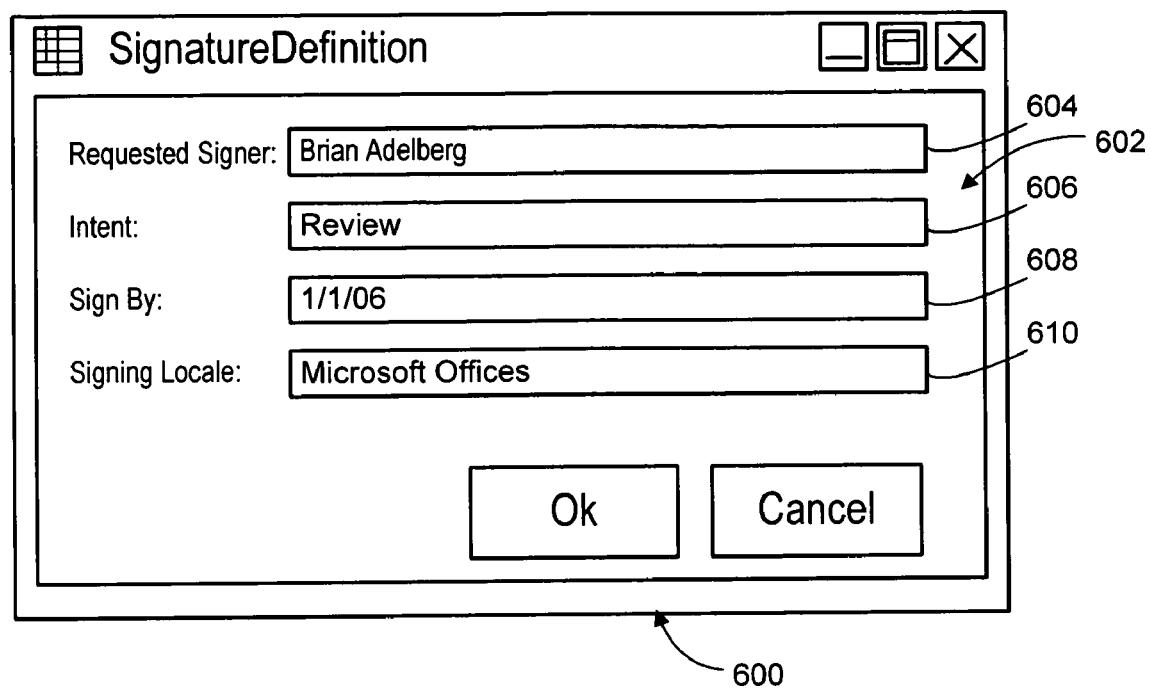
FIG. 6 shows an example of a graphical user interface of an application that utilizes the application programming interface of FIG. 2 to create a signature definition for an XPS document.

FIG. 6 shows an example of a graphical user interface 600 of an application that utilizes the XPS Document API 116 to allow the user to add the signature definitions that are listed in the graphical user interface 500 of FIG. 5. The graphical user interface 600 includes a set 602 of fields for entering the signatures definition data. A field 604 receives the name of the requested signer, field 606 receives the intent behind the requested signature, field 608 specifies the date by which the signature should be provided, and field 610 specifies the location where the signature should be provided. It will be appreciated that the fields shown in FIG. 6 are provided only for purposes of illustration and the number and type of factors for the digital signature definitions may vary from on XPS document to another.

Thus, the XPS document may be created and later accessed by applications including authoring applications and reader applications for purposes of reading, digitally signing, printing, and so forth. The creation of and access to the XPS documents may occur by applications utilizing embodiments of the XPS Document API as disclosed herein.

While the invention has been particularly shown and described with reference to various embodiments thereof, it will be understood by those skilled in the art that various other changes in the form and details may be made therein without departing from the spirit and scope of the invention. For example, the levels for which print tickets and properties of the XPS document are provided by vary and whether those are inherited from a higher lever or are explicitly defined per level may vary.

What is claimed is:

1. A computer-implemented method of creating an extensible markup language paper specification (XPS) document, comprising:
   accessing a collection of resources specified for the creation of an XPS document, the XPS document based upon an extensible markup language;
   establishing individual pages from the collection of resources according to an XPS specification for a page;
   establishing at least one sub-document as a collection of the individual pages;
   establishing the XPS document as a collection of at least one sub-document, providing access to the document sequence via a document sequence writer interface and the method further comprising rendering the XPS document by providing access to the document sequence via a document sequence reader interface;
   defining global properties for the XPS document including accepting digital signatures for the XPS document; and
   providing an application programming interface that performs the acts of accessing the collection, establishing the individual pages, establishing the at least one sub-document, establishing the XPS document, and defining the global properties, the application programming interface comprises:
   providing a resource class that comprises the XPS resources;
   providing a page class that comprises the page reader interface and the page writer interface;
   providing a document class that comprises the document reader interface and the document writer interface;
   and providing a document sequence class that comprises the document sequence reader interface and the document sequence writer interface.

2. The computer-implemented method of claim 1, wherein establishing the document sequence comprises providing access to the sub-documents via a fixed document writer interface and the method further comprising rendering the document sequence by providing access to the sub-documents via a fixed document reader interface.

3. The computer-implemented method of claim 2, wherein establishing the sub-documents comprises providing access to the pages via a page writer interface and the method further comprising rendering the sub-documents by providing access to the pages via a page reader interface.

4. The computer-implemented method of claim 1, wherein providing the application programming interface further comprises providing a document class that provides access to XPS document properties and XPS digital signatures and provides for creating and accessing the document sequence.

5. The computer-implemented method of claim 1, further comprising associating a print ticket with at least one of the individual pages, at least one of the sub-documents, at least a portion of the document sequence, and the entire XPS document.

6. A computer storage medium containing instructions that when executed perform acts comprising:
  accessing a collection of resources specified for the creation of an XPS document, the XPS document based upon an extensible markup language;
  establishing individual pages from the collection of resources according to an XPS specification for a page;
  establishing at least one sub-document as a collection of the individual pages;
  establishing the XPS document as a collection of at least one sub-document, providing access to the document sequence via a document sequence writer interface and the method further comprising rendering the XPS document by providing access to the document sequence via a document sequence reader interface;
  defining global properties for the XPS document including accepting digital signatures for the XPS document; and
  providing an application programming interface that performs the acts of accessing the collection, establishing the individual pages, establishing the at least one sub-document, establishing the XPS document, and defining the global properties, the application programming interface comprises:
  providing a resource class that comprises the XPS resources;
  providing a page class that comprises the page reader interface and the page writer interface;
  providing a document class that comprises the document reader interface and the document writer interface;
  and providing a document sequence class that comprises the document sequence reader interface and the document sequence writer interface.

7. The computer storage medium of claim 6, wherein the application programming interface further comprises an XPS document class that provides access to XPS digital signatures, XPS document properties, and from which the document sequence may be accessed.

8. The computer storage medium of claim 6, wherein the document sequence class includes a print ticket specifying how documents of the document sequence are to be printed where documents do not have print tickets, the document class includes a print ticket that specifies how documents are to be printed, and the page class includes a print ticket specifying how pages are to be printed.

9. The computer storage medium of claim 6, wherein the resources class comprises images and fonts.

10. The computer storage medium of claim 6, wherein each of the document sequence, fixed document, and page classes provide both a reader interface and a writer interface for accessing the classes from a separate application program.

11. A computer system comprising:
  storage containing instructions and resources;
  a processor that implements the instructions to perform acts comprising:
    accessing a collection of resources specified for the creation of an XPS document, the XPS document based upon an extensible markup language;
    establishing individual pages from the collection of resources according to an XPS specification for a page;
    establishing at least one sub-document as a collection of the individual pages;
    establishing the XPS document as a collection of at least one sub-document, providing access to the document sequence via a document sequence writer interface and the method further comprising rendering the XPS document by providing access to the document sequence via a document sequence reader interface;
    defining global properties for the XPS document including accepting digital signatures for the XPS document; and
    providing an application programming interface that performs the acts of accessing the collection, establishing the individual pages, establishing the at least one sub-document, establishing the XPS document, and defining the global properties, the application programming interface comprises:
    providing a resource class that comprises the XPS resources;
    providing a page class that comprises the page reader interface and the page writer interface;
    providing a document class that comprises the document reader interface and the document writer interface;
    and providing a document sequence class that comprises the document sequence reader interface and the document sequence writer interface.

12. The computer system of claim 11, wherein each of the document sequence, document, and page classes include a print ticket.

13. The computer system of claim 11, further comprising a digital signatures interface allowing digital signatures to be provided for each of the document sequence, the sub-documents, and the pages.

14. The computer system of claim 13, wherein the digital signatures interface corresponds to an XPS document class.

* * * * *